United States Patent
Hirata (10) Patent No.: US 7,149,241 B2
(45) Date of Patent: Dec. 12, 2006

(54) MOBILE STATION AND METHOD FOR ALLOCATING FINGER THEREOF IN CDMA COMMUNICATION SYSTEM

(75) Inventor: Masaru Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 878 days.

(21) Appl. No.: 09/974,956

(22) Filed: Oct. 11, 2001

(65) Prior Publication Data

US 2003/0072281 A1    Apr. 17, 2003

(30) Foreign Application Priority Data

Oct. 11, 2000    (JP)    ............................. 2000-310501

(51) Int. Cl.
*H04B 1/69*    (2006.01)
(52) U.S. Cl. ..................................................... 375/148
(58) Field of Classification Search ................ 375/140, 375/206, 136, 147, 130, 144, 142, 143, 151, 375/152, 148; 370/320, 335
See application file for complete search history.

(56) References Cited

U.S. PATENT DOCUMENTS

| | | | |
|---|---|---|---|
| 5,764,687 A * | 6/1998 | Easton | 375/147 |
| 5,936,999 A | 8/1999 | Keskitalo | |
| 6,208,297 B1 * | 3/2001 | Fattouche et al. | 342/450 |
| 6,289,061 B1 * | 9/2001 | Kandala et al. | 375/344 |
| 6,873,648 B1 * | 3/2005 | Atarius et al. | 375/147 |
| 2002/0003791 A1 * | 1/2002 | Hayata | 370/342 |
| 2002/0015399 A1 * | 2/2002 | Hirade | 370/342 |
| 2006/0098719 A1 * | 5/2006 | Baltersee et al. | 375/148 |

FOREIGN PATENT DOCUMENTS

| | | |
|---|---|---|
| EP | 0 924 868 A1 | 6/1999 |
| JP | 6-148246 | 5/1994 |
| JP | 9-181704 | 7/1997 |
| JP | 9-233049 | 9/1997 |
| JP | 11-27180 | 1/1999 |
| JP | 11-98056 | 4/1999 |
| JP | 11-261524 | 9/1999 |
| JP | 11-274978 | 10/1999 |
| JP | 11-298401 | 10/1999 |
| JP | 2000-40981 | 2/2000 |
| JP | 2000-78106 | 3/2000 |
| JP | 2000-92026 | 3/2000 |
| JP | 2000-504173 | 4/2000 |
| JP | 2002-101019 | 4/2002 |
| JP | 2002-111548 | 4/2002 |

(Continued)

*Primary Examiner*—Tesfaldet Bocure
(74) *Attorney, Agent, or Firm*—Scully, Scott, Murphy & Presser, PC (57) ABSTRACT

A finger allocating section 5 allocates path timings corresponding to peak positions of a plurality of radio waves to separate finger sections 6 and further decides a path tracking range in each of the finger sections 6 on the basis of respective distances of peak positions in the plurality of radio waves. For instance, when distances between peak positions in a plurality of radio waves received from a base station 30 are narrow, the finger allocating section narrows a variable path tracking range in each of the finger sections 6. Digital base band signals are inversely spread within a path tracking range decided by the finger allocating section 5 among segments positioned before and after a path timing allocated by the finger allocating section 5. In this way, a system and method is provided for positively receiving a plurality of radio waves in a manner that prevents deterioration of reception.

4 Claims, 5 Drawing Sheets

FOREIGN PATENT DOCUMENTS

| | | |
|---|---|---|
| JP | 2002-141831 | 5/2002 |
| JP | 2002-164817 | 6/2002 |
| WO | WO96/21294 | 7/1996 |
| WO | WO 97/40398 | 10/1997 |
| WO | WO 99/16183 | 4/1999 |
| WO | WO 99/57819 | 11/1999 |
| WO | WO00/25439 | 5/2000 |
| WO | WO 00/65738 | 11/2000 |

* cited by examiner

MOBILE STATION AND METHOD FOR ALLOCATING FINGER THEREOF IN CDMA COMMUNICATION SYSTEM

FIELD OF THE INVENTION

The present invention relates to a mobile station and a method for allocating a finger thereof in CDMA communication system.

BACKGROUND OF THE INVENTION

In recent years, attention has been given to CDMA communication system that is potent against interference and jamming as a communication system used for mobile communication system.

CDMA communication system is the one wherein user signals, which are desired to transmit, are spread with spreading codes to transmit the user signals on a transmitting side, while inverse spreading is made by the use of the same spreading codes as that described above on its receiving side thereby to acquire the original user signals.

Furthermore, in CDMA communication system multipath components due to phasing and the like are synthesized, whereby reliability in data is improved.

In the following, a constitution of a mobile station in CDMA communication system will be described.

Data is transmitted from a base station to a mobile station. In this occasion, however, there is a case where a plurality of paths exists depending upon an environment of the mobile station. For instance, where there are obstacles such as buildings, trees and the like in an environment of the mobile station, radio waves are reflected by these obstacles to present the plurality of paths.

Figure 1:
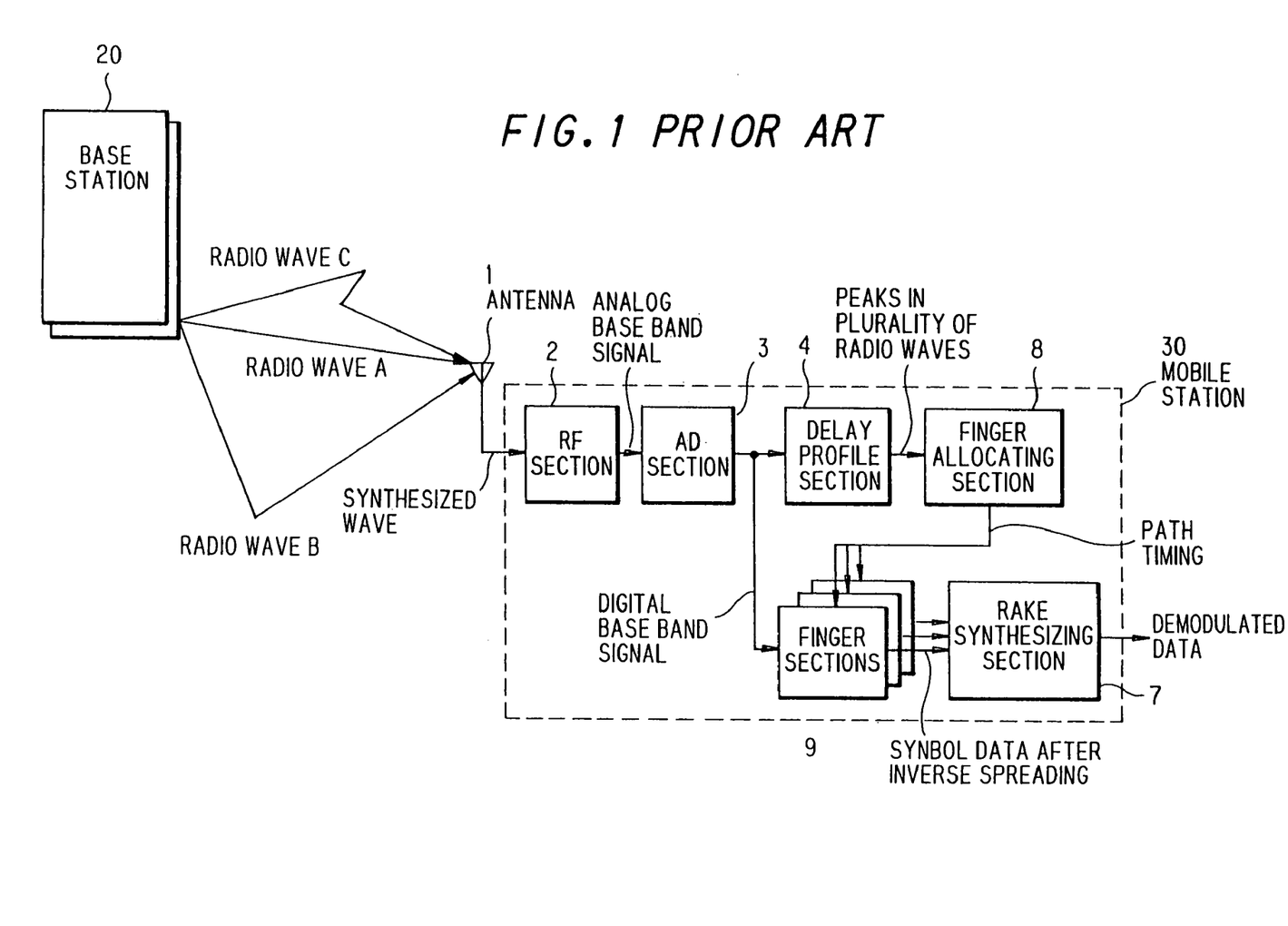
FIG. 1 is a block diagram showing a constitutional example of a mobile station in a conventional CDMA communication system.

FIG. 1 shows an example of a constitution of a mobile station in a conventional CDMA communication system wherein three paths (radio waves A, B, and C) reside in between a base station 20 and the mobile station 30.

As shown in FIG. 1. the mobile station 30 in the present constitutional example is composed of an antenna 1, an RF section 2, an AD section 3, a delay profile section 4, a finger allocating section 8, a plurality of finger sections 9, and a rake synthesizing section 7.

The antenna 1 receives a synthesized wave composed of a plurality of radio waves (radio waves A, B, and C) being arrived from the base station 20 through the plurality of paths. The RF section 2 converts the synthesized wave received by the antenna 1 into analog base band signals. The AD section 3 converts the analog base band signals converted in the RF section 2 into digital base band signals.

Figure 2:
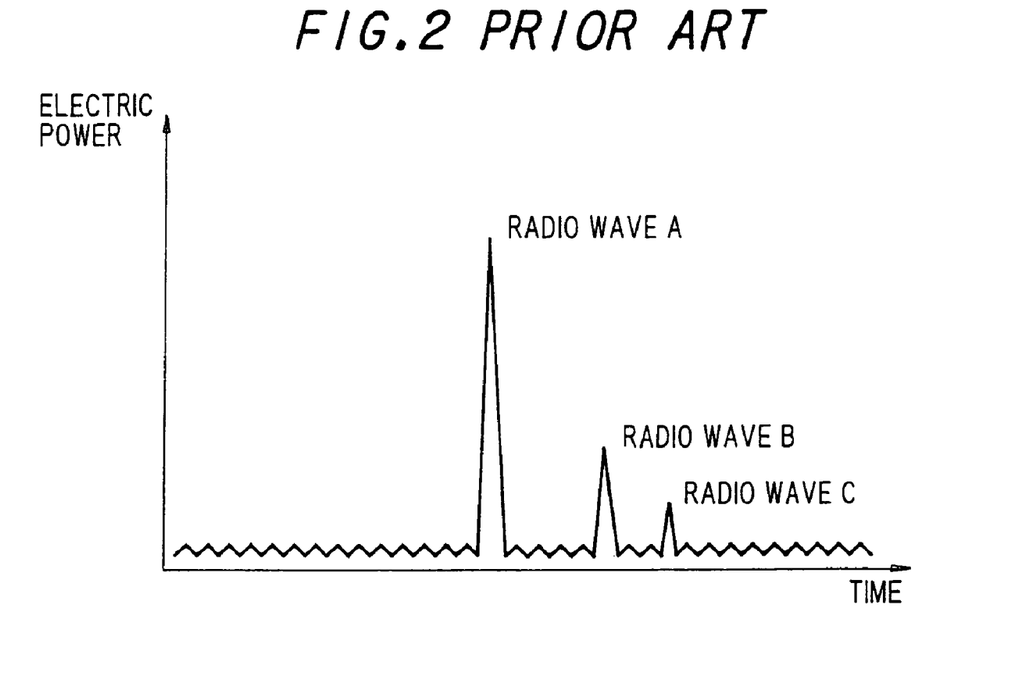
FIG. 2 is a graphical representation illustrating an example of a delay profile prepared in a delay profile section shown in FIG. 1.

The delay profile section 4 acquires data transmitted from the base station 20 by spreading inversely with the use of the digital base band signals converted in the AD section 3. In this case a delay profile is prepared by adding cumulatively the data acquired in a certain time interval for retrieving multipath components. In the case where multipath components exist, a plurality of peaks of the radio waves (radio waves A, B, and C) can be detected in a delay profile as shown in FIG. 2.

The finger allocating section 8 allocates path timings (reference timings) corresponding to positions of the respective peaks in the plurality of the radio waves detected in the delay profile section 4 to a separate finger sections 9, respectively.

Each of the finger sections 9 spreads inversely the digital base band signals converted by the AD section 3 at the respective path timings allocated by the finger allocating section 8, whereby data transmitted from the base station 20 is regenerated. The rake synthesizing section 7 synthesizes the data regenerated in the respective finger sections 9 to output demodulated data.

In the following, operation for path detection in the delay profile section 4 will be described.

The delay profile section 4 adds cumulatively data transmitted from the base station 20 for a certain period of time to prepare a delay profile. Such cumulative addition is implemented for the sake of discriminating a plurality of peaks in radio waves from noises, and in this respect, the longer period of time for cumulative addition can improve the better reliability in peak points.

Figure 3:
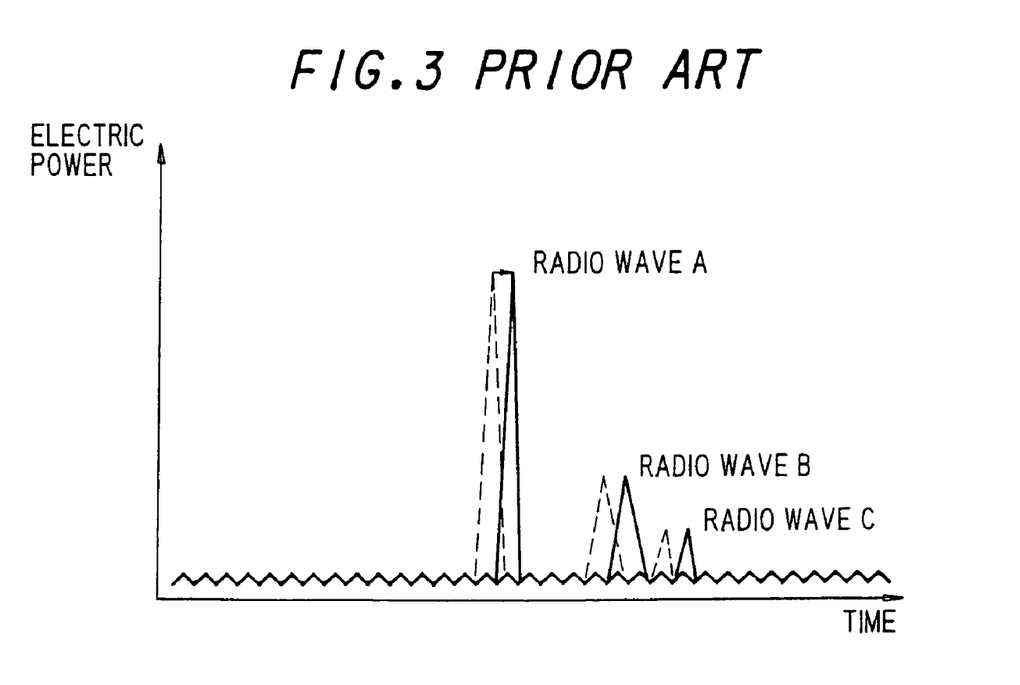
FIG. 3 is a graphical representation for explaining fluctuation in peak positions (path timings) of respective radio waves shown in FIG. 2.

However, too long period of time for cumulative addition brings about a possibility of displacement in peak points due to out of alignment in reference timing in between the base station 20 and the mobile station 30, influence of clock jitter inside the mobile station 30 or the like as shown in FIG. 3.

Accordingly, each of the finger sections 9 tracks a path at a shorter cycle than a period of time for cumulative addition in the delay profile section 4 in order to follow positional changes (displacement) in peak points of the path.

In the following, path tracking operation in each of the finger sections 9 will be described by referring to FIG. 4.

Figure 4:
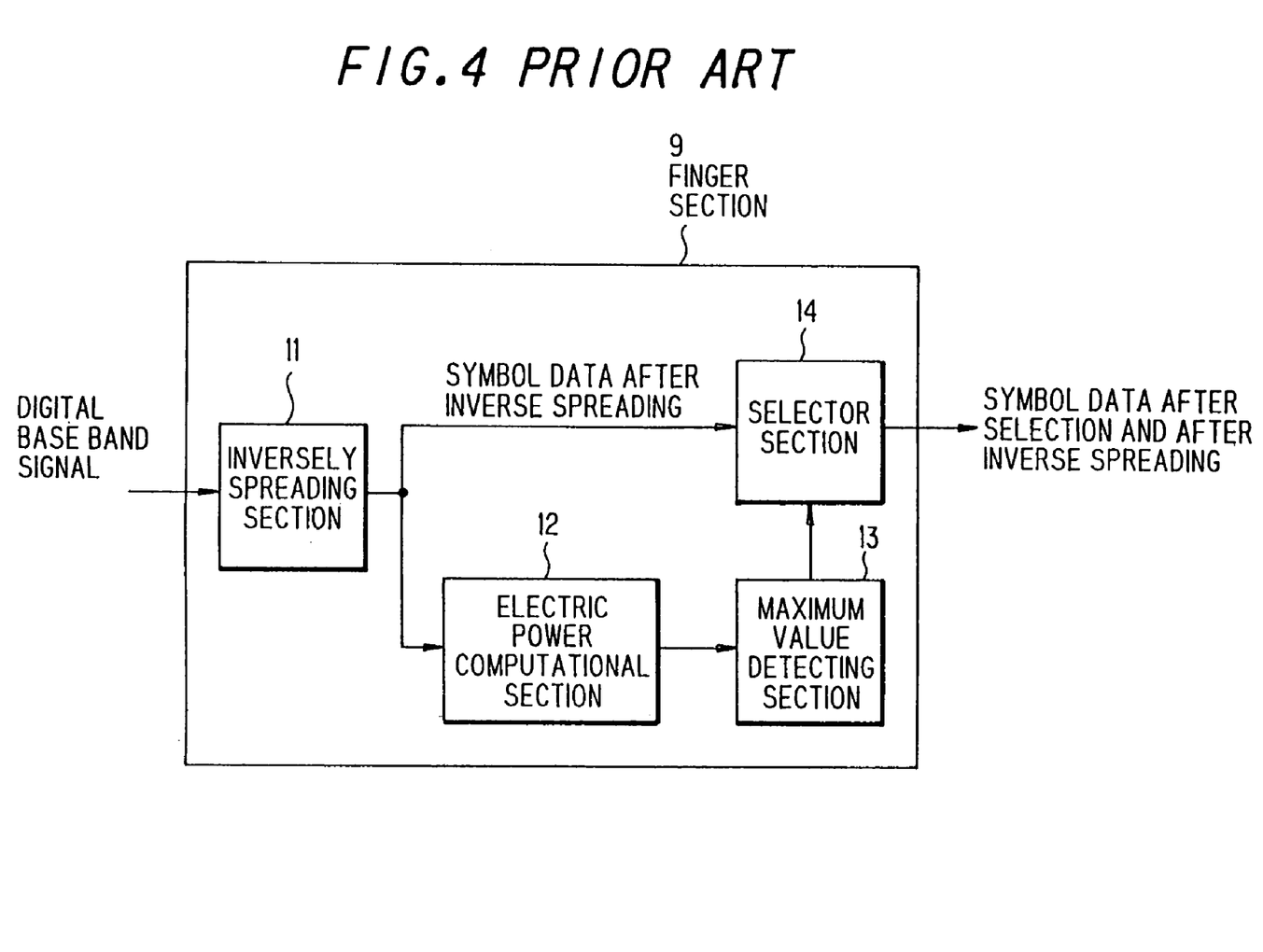
FIG. 4 is a block diagram showing a constitutional example of the finger section shown in FIG. 1.
Figure 6:
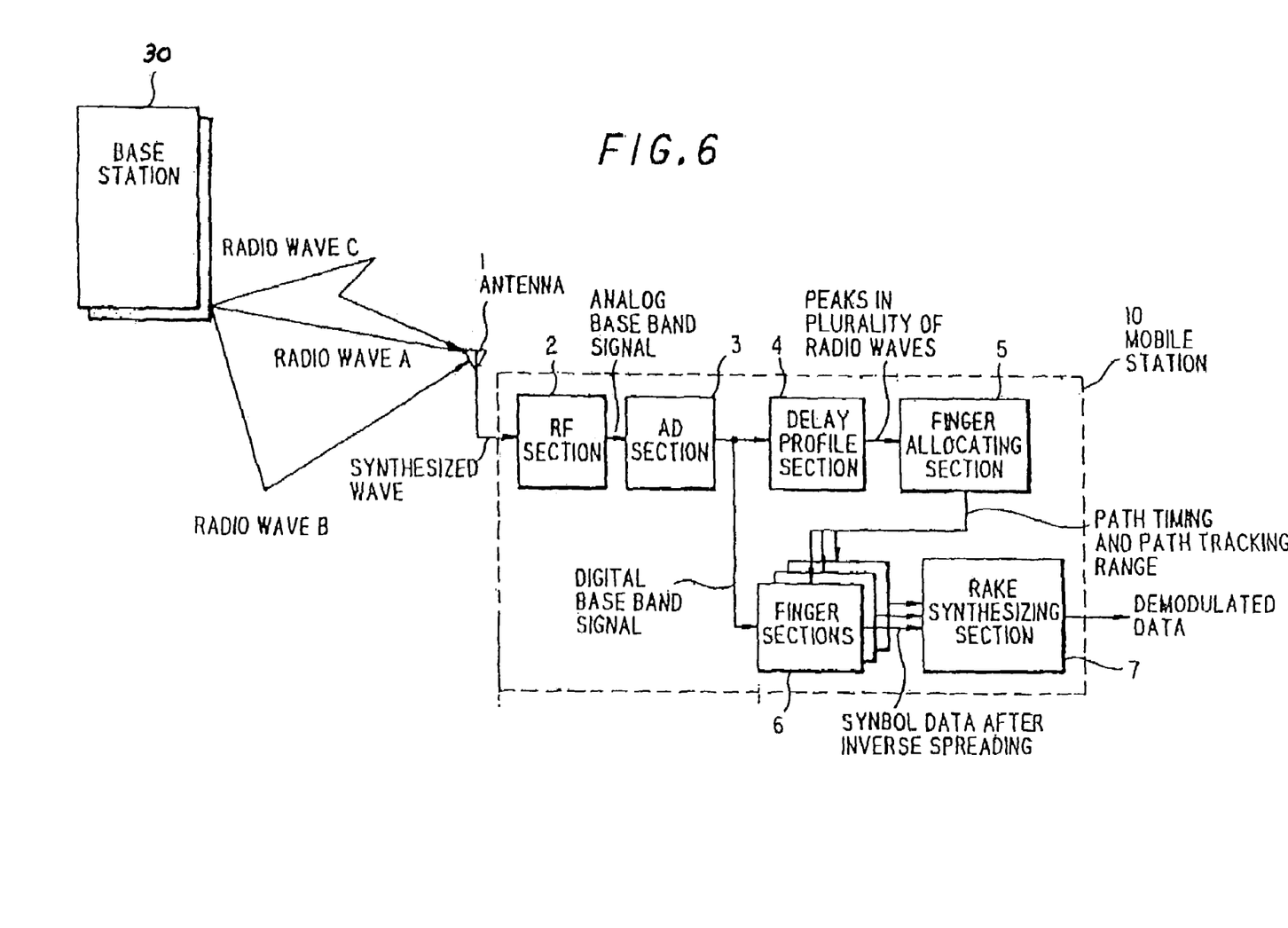
FIG. 6 is a block diagram showing an embodiment of a mobile station in CDMA communication system according to the present invention.

FIG. 4 is a block diagram showing an example of a constitution of each of the finger sections 9 shown in FIG. 6.

As shown in FIG. 4, the finger section 9 in the present constitutional example is composed of an inversely spreading section 11, an electric power computational section 12, a maximum value detecting section 13, and a selector section 14.

The inversely spreading section 11 converts digital base band signals converted by the AD section 3 into data. Furthermore, the inversely spreading section 11 performs inverse spreading within a predetermined segment positioned between before and after segments of a path timing allocated by the finger allocating section a (hereinafter referred to as "path tracking range"). For instance, when inverse spreading is performed within path tracking ranges defined among five sections extending over before and after path timing, the inversely spreading section 11 outputs symbol data reside among the five sections, i.e., five symbol data.

The electric computational section 12 computes each of electric power values of the five symbol data output from the inversely spreading section 11. The maximum value detecting section 13 detects the maximum value among five electric power values computed by the electric power computational section 12.

The selector section 14 selects only the symbol data having the maximum electric power value detected by the maximum value detecting section 13 among the five symbol data computed in the inversely spreading section 11 to output them.

As described above, inverse spreading is implemented within a predetermined path tracking range among segments positioned in between before and after the path timing instructed by the finger allocating section 8 thereby to acquire data, and the maximum electric power value is retrieved from the data, so that the finger section 9 follows delicate fluctuation.

Figure 5:
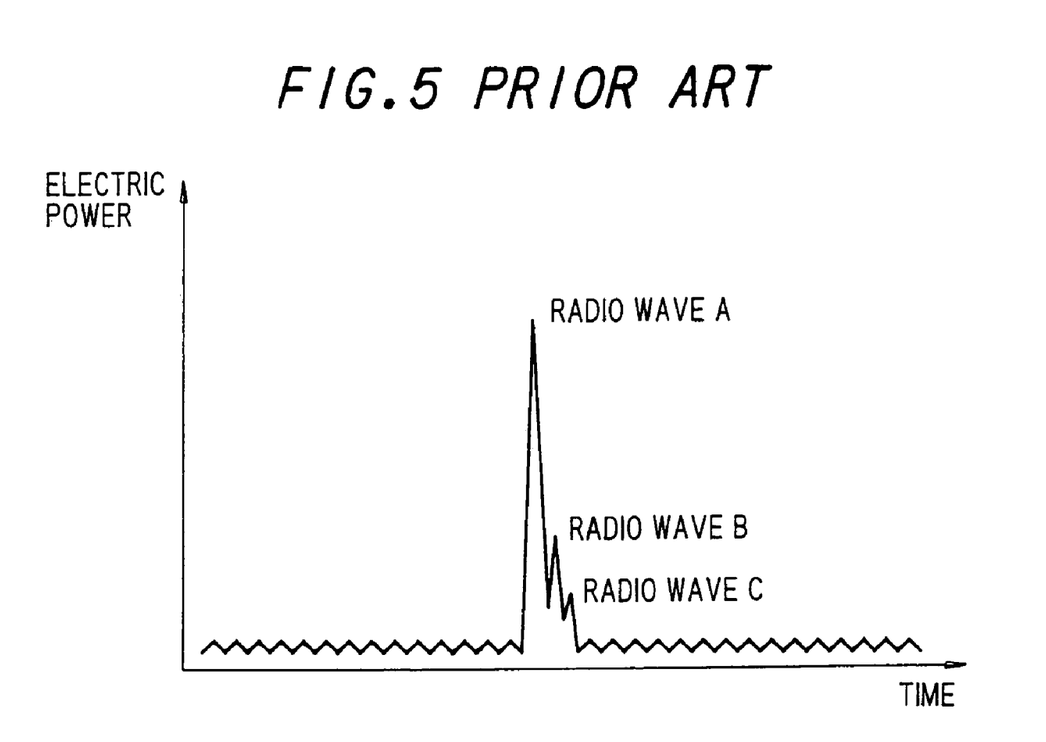
FIG. 5 is a graphical representation illustrating another example of a delay profile prepared in the delay profile section shown in FIG. 1.

In a conventional mobile station as mentioned above, however, when it is assumed that there are three radio waves being arrived from a base station to the mobile station (radio waves A, B, and C) and that each of path timings in the radio waves A, B, and C is allocated to each of separate finger sections in the case where distances of peak positions in the three radio waves are narrow, respectively, as shown in FIG. 5, inverse spreading is implemented within a predetermined path tracking range defined among segments positioned in between before and after a path timing in each finger section. As a result, inverse spreading timings in all the finger sections overlap with the radio wave A residing at a point of the maximum electric power value, whereby a plurality of radio waves comes to be not received, so that there is a problem of deteriorating reception property in mobile station.

SUMMARY OF THE INVENTION

Accordingly, the present invention has been made in view of the problems involved in the prior arc as mentioned above. An object of the present invention is to provide a mobile station and a method for allocating a finger thereof in CDMA communication system by which a plurality of radio waves is positively received in even a case where distances of peak positions in the plurality of radio waves being arrived from a base station to the mobile station are narrow, whereby deterioration in reception property can be prevented.

In order to achieve the above-described object, a mobile station in CDMA communication system according to the present invention wherein the mobile station is composed of a plurality of finger sections in each of which each of plural radio waves being arrived from a base station through a plurality of paths is inversely spread to regenerate data from the base station, and a finger allocating section for allocating a path timing corresponding to each peak position of the plurality of radio waves to each of the plurality of finger sections; each of the plurality of radio waves is inversely spread in a path tracking range among segments positioned before and after the path timing allocated by the finger allocating section comprises the path tracking range being variable in each of the plurality of finger sections.

Furthermore, a mobile station in CDMA communication system according to the present invention as described above is characterized in that the finger allocating section instructs the path tracking range with respect to each of the plurality of finger sections; and each of the plurality of finger sections makes variable the path tracking range on the basis of the instruction by the finger allocating section.

Moreover, a mobile station in CDMA communication system according to the present invention as described above is characterized in that the finger allocating section decides the path tracking range in each of the plurality of finger sections on the basis of each distance of peak positions in the plurality of radio waves.

Still further, a mobile station in CDMA communication system according to the present invention as described above is characterized in that the mobile station in CDMA communication system is composed of an antenna for receiving a plurality of radio waves being arrived from the base station through the plurality of paths; an RF section for converting the plurality of radio waves received by the antenna into analog base band signals; an A/D section for converting the analog base band signals converted by the RF section into digital base band signals; a delay profile section for inversely spreading the digital base band signals converted by the A/D section in every predetermined periods of time to detect the respective peaks of the plurality of radio waves; and a rake synthesizing section for synthesizing data regenerated in each of the plurality of finger sections: the finger allocating section allocates a path timing corresponding to each peak position of the plurality of radio waves detected by the delay profile section to each of the plurality of finger sections, and further decides the path tracking range in each of the plurality of finger sections on the basis of each of distances of peak positions in the plurality of radio waves detected by the delay profile section; besides, each of the plurality of finger sections spreads inversely the digital base band signals converted by the A/D section within a path tracking range decided by the finger allocating section among segments positioned before and after each of path timings allocated by the finger allocating section, whereby data from the base station is regenerated.

Yet further, a method for allocating a finger of a mobile station in CDMA communication system involving a plurality of finger sections for spreading inversely each of a plurality of radio waves being arrived from a base station through a plurality of paths to generate data from the base station according to the present invention comprises the steps of detecting each peak of the plurality of radio waves to allocate a path timing corresponding to each peak of the positions detected to each of the plurality of finger sections; and deciding a path tracking range in each of the plurality of finger sections; the plurality of radio waves being inversely spread within the path tracking rage among segments positioned before and after the path timing in each of the plurality of finger sections.

Further, a method for allocating a finger according to the present invention as described above is characterized in that the path tracking range in each of the plurality of finger sections is decided on the basis of each distance of peak positions in the plurality of radio waves.

In the present invention constituted as described above, a finger allocating section allocates path timings corresponding to peak positions of a plurality of radio waves being arrived from a base station through a plurality of paths to a plurality of finger sections, respectively, and further decides a path tracking range in each of the plurality of the finger sections on the basis of respective distances of peak positions in the plurality of radio waves, while the plurality of radio waves are inversely spread within a path tracking range decided by the finger allocating section among segments positioned before and after a path timing allocated by the finger allocating section in each of the finger sections, whereby data transmitted from the base station is regenerated.

In these circumstances, for example, when a plurality of radio waves being arrived from the base station to a mobile station have distances of peak positions, which are narrow from one another, the finger allocating section narrows a path tracking range in each of the finger sections. Accordingly, it becomes possible to conduct inverse spreading within a path tracking range independent from other path tracking ranges in each of the finger sections.

BRIEF DESCRIPTION OF THE DRAWINGS

The present invention will be explained in more detail in conjunction with appended drawings, wherein.

DESCRIPTION OF THE PREFERRED EMBODIMENTS

In the following, an embodiment of the present invention will be described in detail by referring to the accompanying drawings wherein FIG. 6 is a block diagram showing an embodiment of a mobile station in CDMA communication system according to the present invention. In FIG. 6, it is assumed that three paths (radio waves A, B, and C) reside in between a mobile station 10 and a base station 30. Like parts of a mobile station 30, which are shown in FIG. 1, are designated by the same reference characters therein as those of FIG. 6, and the description relating thereto will be omitted.

As shown in FIG. 6, a finger allocating section 5 and a plurality of finger sections 6 are disposed in the mobile station 10 of the present embodiment in place of the finger allocating section 8 and the plurality of the finger sections 9 shown in FIG. 1, and the remaining constitution of the mobile station 30 in FIG. 6 is the same as that of FIG. 1.

The finger allocating section 5 allocates path timings corresponding to peak positions of a plurality of radio waves detected by a delay profile section 4 to separate finger sections 6, respectively, and further decides a path cracking range in each of the finger sections 6 on the basis of respective distances of peak positions in the plurality of radio waves.

In each of the finger sections 6, a path tracking range is variable. Digital base band signals converted by an AD section 3 are inversely spread within a path tracking range decided by the finger allocating section 5 among segments positioned before and after a path timing allocated by the finger allocating section 5, whereby data transmitted from the base station 20 is regenerated.

In the following, a method for allocating a finger of a mobile station in CDMA communication system constituted as described above will be described.

For instance, when three radio waves (radio waves A, B, and C) being arrived from the base station 20 to the mobile station 10 reside and distances of peak positions of the three radio waves are distant from one another as shown in FIG. 2, the finger allocating section 5 broadens a path tracking range in each of the finger sections 6 (into, e.g., a five-point segment), while the finger allocating section 5 narrows a path tracking range in each of the finger sections 6 (into, e.g., a three-point segment) in the case where distances of peak positions of the three radio waves are narrow from one another as shown in FIG. 5.

Thus, it becomes possible to conduct inverse spreading within a path tracking range independent from other path tracking ranges in each of the finger sections 6. Accordingly, it becomes possible to receive positively all the radio waves.

As described above, the present invention is constituted in such that a finger allocating section allocates path timings corresponding to peak positions of a plurality of radio waves being arrived from a base station through a plurality of paths to a plurality of finger sections, respectively, and further decides a path tracking range in each of the plurality of the finger sections on the basis of respective distances of peak positions in the plurality of radio waves, while the plurality of radio waves are inversely spread within a path tracking range decided by the finger allocating section among segments positioned before and after a path timing allocated by the finger allocating section in each of the finger sections, whereby data transmitted from the base station is regenerated.

In these circumstances, for example, when a plurality of radio waves being arrived from the base station to a mobile station have distances of peak positions, which are distant from one another, the finger allocating section broadens a path tracking range in each of the finger sections, while the finger allocating section narrows a path tracking range in each of the finger sections. According to such arrangement as described above, inverse spreading can be conducted within a path tracking range independent from other path tracking ranges in each of the finger sections. Hence, it becomes possible to receive positively all the radio waves, whereby deterioration in reception property in the mobile station can be prevented.

Furthermore, even when peak positions in respective radio waves fluctuate due to a discrepancy in reference timing of a base station and a mobile station, influence of clock jitter inside the mobile station and the like, inverse spreading can be implemented within a path tracking range in response to fluctuations in the peak positions.

The presently disclosed embodiments are therefore considered in all respects to be illustrative and not restrictive. The scope of the invention is indicated by the appended claims rather than the foregoing description and all changes that come within the meaning and range of equivalents thereof are intended to be embraced therein.

What is claimed is:

1. A mobile station in a CDMA communication system, the mobile station comprising:

a plurality of finger sections in each of which each of plural radio waves being arrived from a base station through a plurality of paths is inversely spread to regenerate data from said base station; and a finger allocating section for allocating a path timing corresponding to each peak position of said plurality of radio waves to each of said plurality of finger sections, each of said plurality of radio waves being inversely spread in a path tracking range among segments positioned before and after the path timing allocated by said finger allocating section, said path tracking range in each of said plurality of finger sections being variably determined based on the respective distances between peak positions of said plurality of radio waves, said path tracking range being broadened when said distances are large, and said path tracking range being narrowed when said distances are small, and said path timing range being independently determined for each of said plurality of finger section.

2. A mobile station in a CDMA communication system as claimed in claim 1, wherein: said finger allocating section instructs said path tracking range with respect to each of said plurality of finger sections; and each of said plurality of finger sections makes variable said path tracking range on the basis of the instruction by said finger allocating section.

3. A mobile station in a CDMA communication system as claimed in claim 1, further comprising:

an antenna for receiving a plurality of radio waves being arrived from said base station through said plurality of paths;

an RF section for converting the plurality of radio waves received by said antenna into analog base band signals;

an A/D section for converting the analog base band signals converted by said RF section into digital base band signals;

a delay profile section for inversely spreading the digital base band signals converted by said A/D section in every predetermined periods of time to detect the respective peaks of said plurality of radio waves; and a rake synthesizing section for synthesizing data regenerated in each of said plurality of finger sections; said finger allocating section allocates a path timing corresponding to each peak position of the plurality of radio waves detected by said delay profile section to each of said plurality of finger sections, and further decides said path tracking range in each of said plurality of finger sections on the basis of each of distances of peak positions in the plurality of radio waves detected by said delay profile section; besides, each of said plurality of finger sections spreads inversely the digital base band signals converted by said AID section within a path tracking range decided by said finger allocating section among segments positioned before and after each of path timings allocated by said finger allocating section, whereby data from said base station is regenerated.

4. A method for allocating a finger of a mobile station in CDMA communication system involving a plurality of finger sections for spreading inversely each of a plurality of radio waves being arrived from a base station through a plurality of paths to generate data from said base station, comprising the steps of:

detecting each peak of said plurality of radio waves to allocate a path timing corresponding to each peak of the positions detected to each of said plurality of finger sections; and deciding a path tracking range independently for each of said plurality of finger sections, said plurality of radio waves being inversely spread within said path tracking range among segments positioned before and after said path timing in each of said plurality of finger sections, said path tracking range in each of said plurality of finger sections being variably determined based on the respective distances between peak positions of said plurality of radio waves, said path tracking range being broadened when said distances are large, and said path tracking range being narrowed when said distances are small.

* * * * *